(12) United States Patent
Bramblett et al.

(10) Patent No.: US 11,862,957 B2
(45) Date of Patent: Jan. 2, 2024

(54) FLARED HINGED-FOLDING UTILITY VAULT DEVICE

(71) Applicant: AFL Telecommunications LLC, Duncan, SC (US)

(72) Inventors: Andru Bramblett, Montrose, AL (US); Erick Crosby, Magnolia Springs, AL (US); Dustin Nolen, Mount Olive, AL (US); Raymond G. Thompson, Hoover, AL (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 17/792,634

(22) PCT Filed: Jan. 14, 2021

(86) PCT No.: PCT/US2021/013500
§ 371 (c)(1),
(2) Date: Jul. 13, 2022

(87) PCT Pub. No.: WO2021/146472
PCT Pub. Date: Jul. 22, 2021

(65) Prior Publication Data
US 2023/0047792 A1 Feb. 16, 2023

Related U.S. Application Data

(60) Provisional application No. 62/960,779, filed on Jan. 14, 2020.

(51) Int. Cl.
*H02G 9/10* (2006.01)
*H02G 3/08* (2006.01)

(52) U.S. Cl.
CPC ............... *H02G 9/10* (2013.01); *H02G 3/086* (2013.01)

(58) Field of Classification Search
CPC .......... H02G 3/08; H02G 3/081; H02G 3/086; H02G 3/185; H02G 3/03; H02G 3/088;
(Continued)

(56) References Cited

U.S. PATENT DOCUMENTS 1,441,343 A 1/1923 Hartshorn
4,266,670 A 5/1981 Mykleby
(Continued)

FOREIGN PATENT DOCUMENTS

WO WO2015107355 A2 7/2015

OTHER PUBLICATIONS

International Patent Application No. PCT/US2021/013500; International Search Report; dated Apr. 5, 2021; (1 page).

*Primary Examiner* — King M Chu
(74) *Attorney, Agent, or Firm* — Dority & Manning, P.A.

(57) ABSTRACT

A folding, flared utility vault or enclosure that may be used to protect public utility valves, electrical cables, switches, fiber optic cables, or the like is provided. The system generally comprises a base box having a front panel, back panel, and side panels. Alternative embodiments may further comprise an extension box having a front extension panel, back extension panel, and side extension panels. The various panels of the base box and extension box may have flared bottoms that prevent removal after installation. Additionally a user may attach extension boxes to the base box to increase the amount of storage area within the system.

23 Claims, 8 Drawing Sheets

(58) Field of Classification Search
CPC . H02G 3/283; H02G 9/10; H02B 1/28; H02B 1/505
USPC ........ 220/4.02, 484, 567.1; 174/50; 361/601
See application file for complete search history.

(56) References Cited

U.S. PATENT DOCUMENTS

| | | | |
|---|---|---|---|
| 6,772,566 B1 * | 8/2004 | Machledt | H02G 9/10 52/36.2 |
| 7,234,275 B1 * | 6/2007 | Haggy | E01F 15/088 256/26 |
| 8,307,604 B2 | 11/2012 | Stepanian et al. | |
| 10,362,710 B2 * | 7/2019 | Alarcon | H04Q 1/14 |

* cited by examiner

FIG. 9

FLARED HINGED-FOLDING UTILITY VAULT DEVICE

CROSS REFERENCES

This application is a National Stage Patent Application of PCT/US2021/013500, filed on Jan. 14, 2021, which claims the benefit of priority to U.S. Provisional Patent Application No. 62/960,779, filed on Jan. 14, 2020, the disclosures of all of which are incorporated by reference herein in their entireties.

FIELD OF THE DISCLOSURE

The subject matter of the present disclosure refers generally to a folding, flared, hinged utility vault or enclosure device that may be modular.

BACKGROUND

In order to protect utility equipment, including, but not limited to, valves for water or natural gas, or switchgear for electrical or telecommunications equipment, a utility vault or enclosure is often used. Over time it is common for additional equipment to be added to utility enclosures, resulting in the utility enclosures having limited space therein for future equipment. The most common forms of utility vaults are concrete utility vaults. These concrete vaults possess several disadvantages. First, concrete utility vaults are heavy and take up a significant amount of space during transportation, which greatly increases the cost of the product. The weight and bulk of concrete utility vaults makes them cumbersome and difficult to install once the public utilities have been put into place. Second, concrete is prone to cracking over time. This factor is especially relevant in environments that are prone to frequent freezing, which leads to water within the concrete to expand and ultimately break down the concrete vaults over time. Third, current concrete utility vault manufacturing processes utilize generally straight and rigid side walls. The rigid configurations make packaging a plurality of vaults together difficult, and the straight walls limit the amount of future equipment that may be enclosed within each vault.

For these reasons, plastic or composite utility vaults have gained popularity in recent years. Compared with concrete, the plastic enclosures are significantly lower in weight and more economical to transport. The plastic or composite utility vaults additionally provide enhanced weather resistance compared with concrete vaults. However, current plastic utility vaults lack certain benefits compared with concrete counterparts. For instance, the weight of concrete utility vaults assists with stability and stacking of the utility vaults. The stacking is especially important for applications in which larger utility vaults may be needed or when additional equipment must be placed in the vault. Additionally, larger sized concrete utility vaults are more readily accessible when compared with plastic or composite utility vaults.

Accordingly, there is a need in the art for a folding, flared utility vault having optional extension sections that may be used for utility installation applications.

DESCRIPTION OF THE DRAWINGS

These and other features, aspects, and advantages of the present disclosure will become better understood with regard to the following description, appended claims, and accompanying drawings where:

DETAILED DESCRIPTION

In this Detailed Description, and the Claims below, and in the accompanying drawings, reference is made to particular features, including process steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally. Where reference is made herein to a process comprising two or more defined steps, the defined steps can be carried out in any order or simultaneously (except where the context excludes that possibility), and the process can include one or more other steps which are carried out before any of the defined steps, between two of the defined steps, or after all the defined steps (except where the context excludes that possibility).

The term "comprises" and grammatical equivalents thereof are used herein to mean that other components, steps, etc. are optionally present. For instance, a system "comprising" components A, B, and C can contain only components A, B, and C, or can contain not only components A, B, and C, but also one or more other components. The term "at least one of . . . and" and grammatical equivalents thereof are used herein to mean that at least one of a group of items is present but more components of that group can be present. For instance, a system comprising at least one of components A, B, and C can contain only components A and B, or can contain multiple components A and C, but only one of component B. As used herein, the term "at least one" and grammatical equivalents thereof are used herein to mean that one or more of an item is present. For instance, at least one magnet means that an embodiment exists with a single magnet as well embodiments with multiple magnets.

Figure 4:
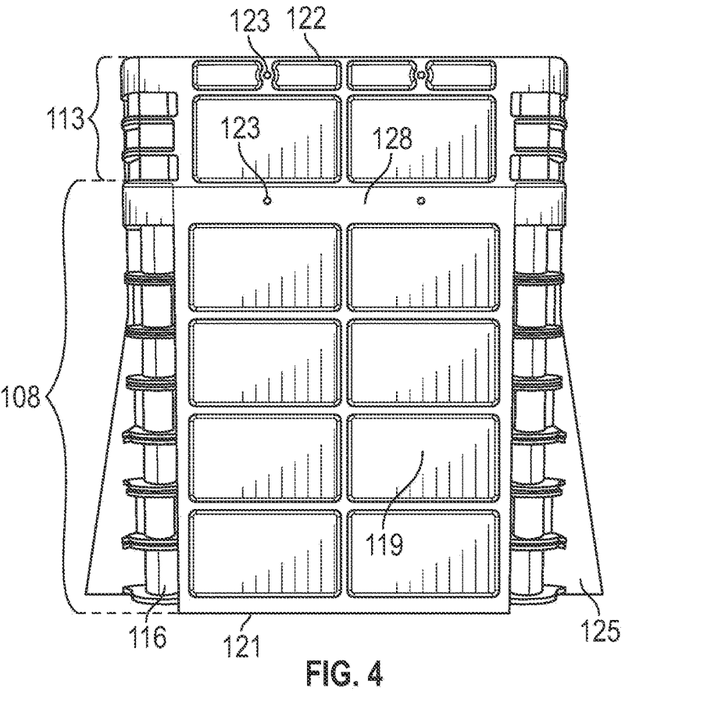
FIG. 4 is a first side view of a device having features consistent with the invention of the present disclosure.
Figure 5:
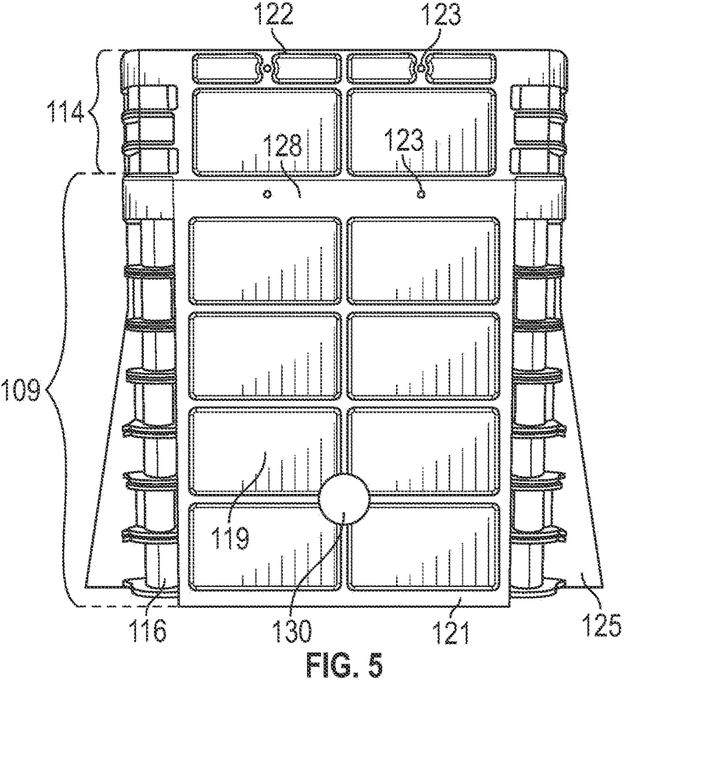
FIG. 5 is a second side view of a device having features consistent with the invention of the present disclosure.
Figure 6:
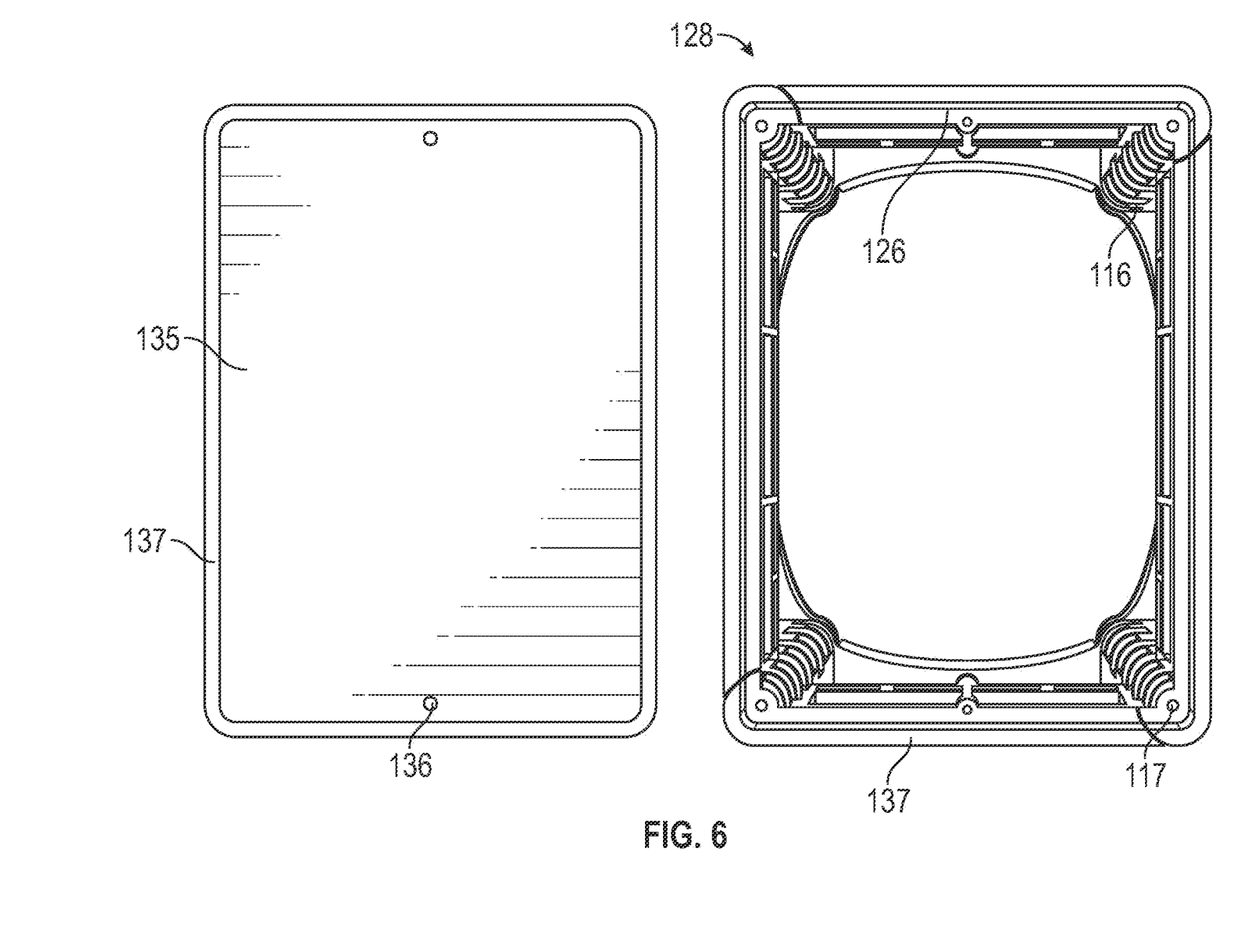
FIG. 6 is a top view of a of a device having features consistent with the invention of the present disclosure.

FIGS. 1A-9 illustrate embodiments of a folding, flared utility vault or enclosure that may be used to protect public utility valves, electrical cables, switches, fiber optic cables, or the like. It is understood that the various method steps associated with the methods of the present disclosure may be carried out by a worker 805 using the device 100 shown in FIGS. 1A-8. The system 100 generally comprises a base box 105. Alternative embodiments further comprise an extension box 110. The base box 105 comprises a front panel 106, back panel 107, and side panels. The extension box 110 comprises a front extension panel 111, back extension panel 112, and side extension panels. As illustrated in FIGS. 1A-8, the front panel 106, back panel 107, first side panel 108, and second side panel 109 of the base box 105 and the front extension panel 111, back extension panel 112, first side extension panel 113, and second side extension panel 114 of the extension box 110 may be attached to one another via a hinge 115. In other embodiments, the base box 105 is utilized on its own without the extension box 110. As illustrated in FIGS. 1A-7, the device 100 is a fully functional enclosure system 100. A lid 135, as illustrated in FIG. 6, may attach directly to the top of the base box 105. In another embodiment, a floor may be attached to the bottom of the base box 105 and/or extension box 110 to compartmentalize areas within the utility vault. The extension box 110 may be attached to the base box 105 prior to or after installation. In a preferred embodiment, the extension box 110 is added after initial installation of the base box 105, which is one method of increasing the interior space of a vault.

Figure 1A:
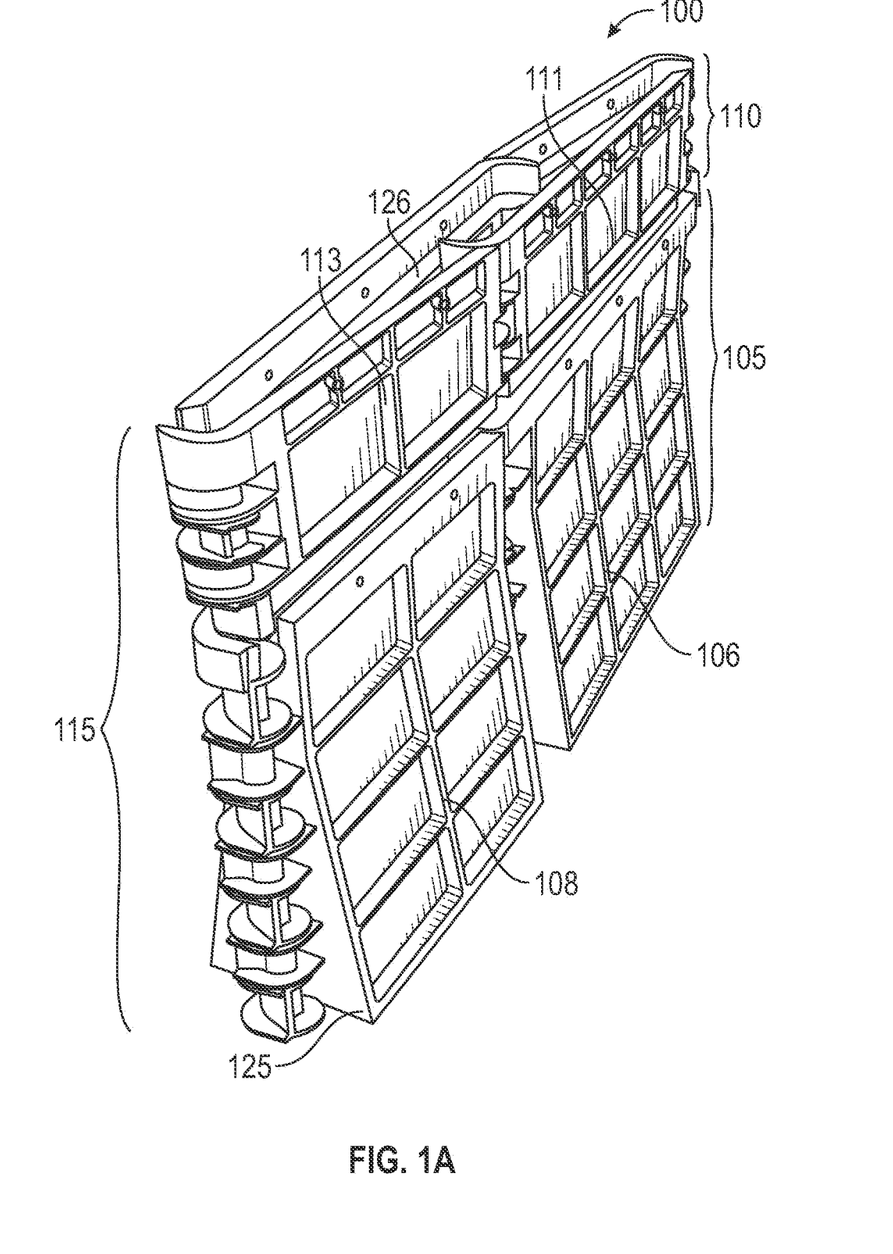
FIG. 1A is a perspective view of a device having features consistent with the invention of the present disclosure.
Figure 1B:
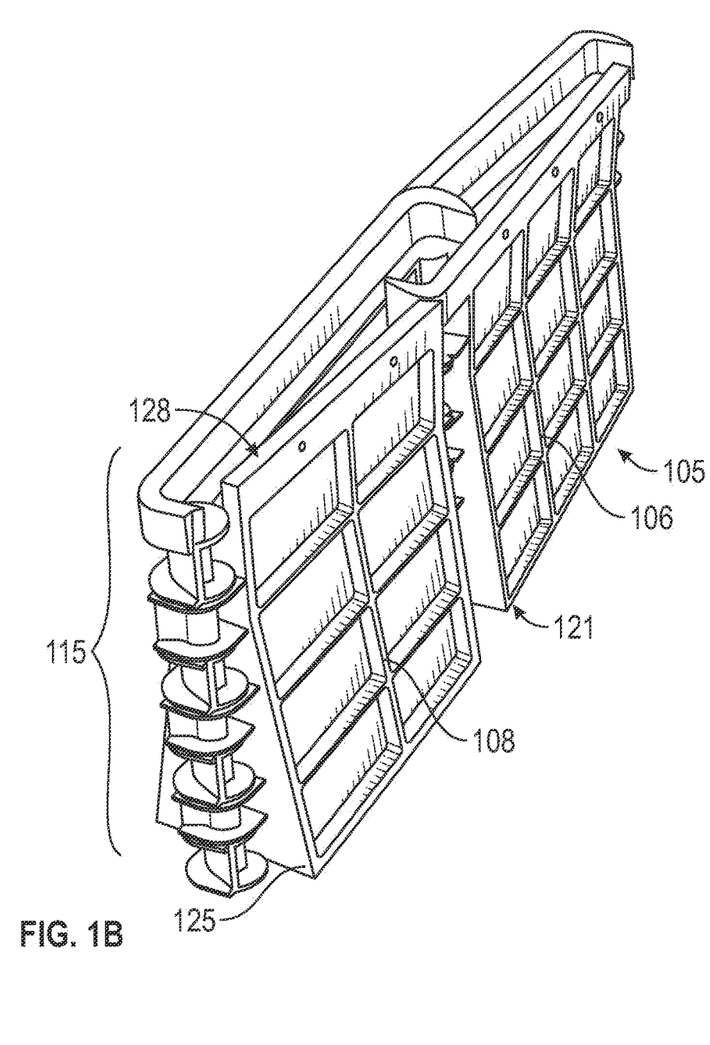
FIG. 1B is a perspective view of a device having features consistent with the invention of the present disclosure.
Figure 2:
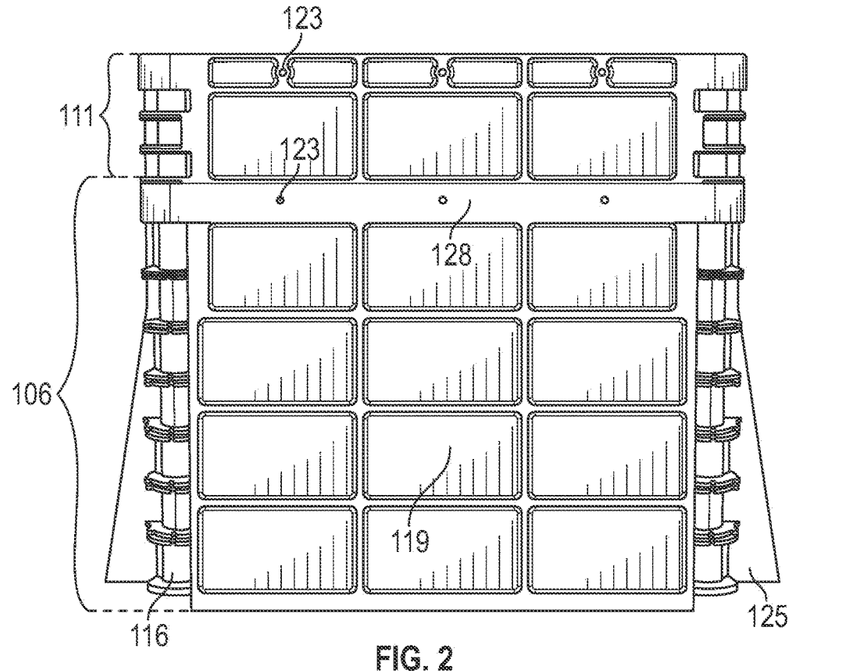
FIG. 2 is a front view of a device having features consistent with the invention of the present disclosure.
Figure 3:
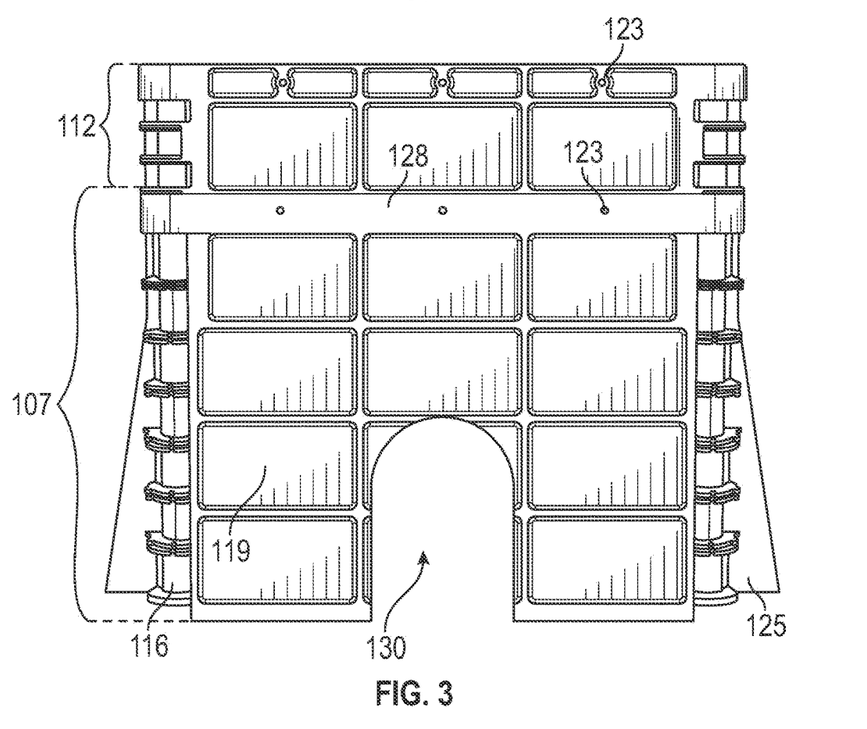
FIG. 3 is a back view of a device having features consistent with the invention of the present disclosure.
Figure 7:
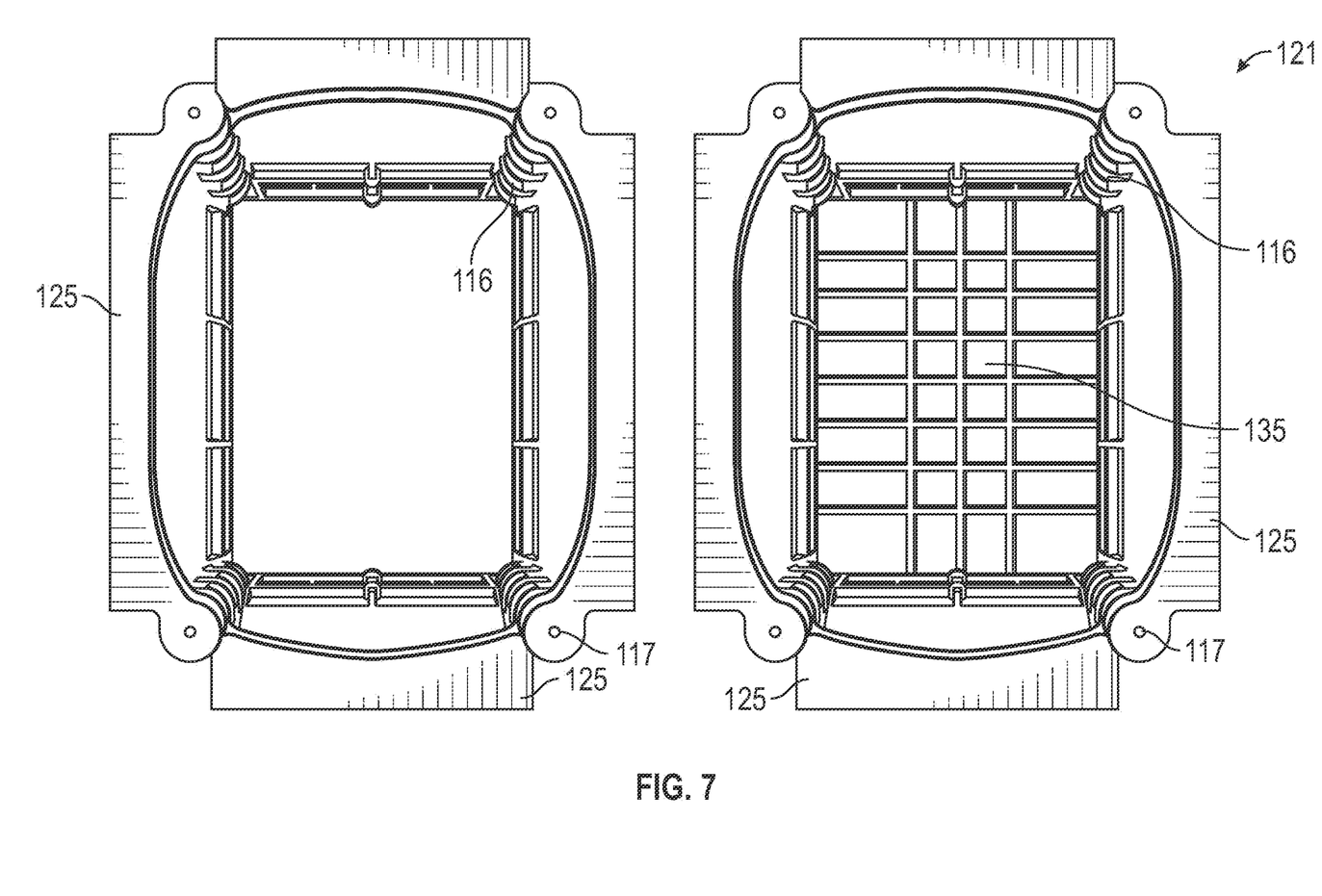
FIG. 7 is a bottom view of a of a device having features consistent with the invention of the present disclosure.
Figure 8:
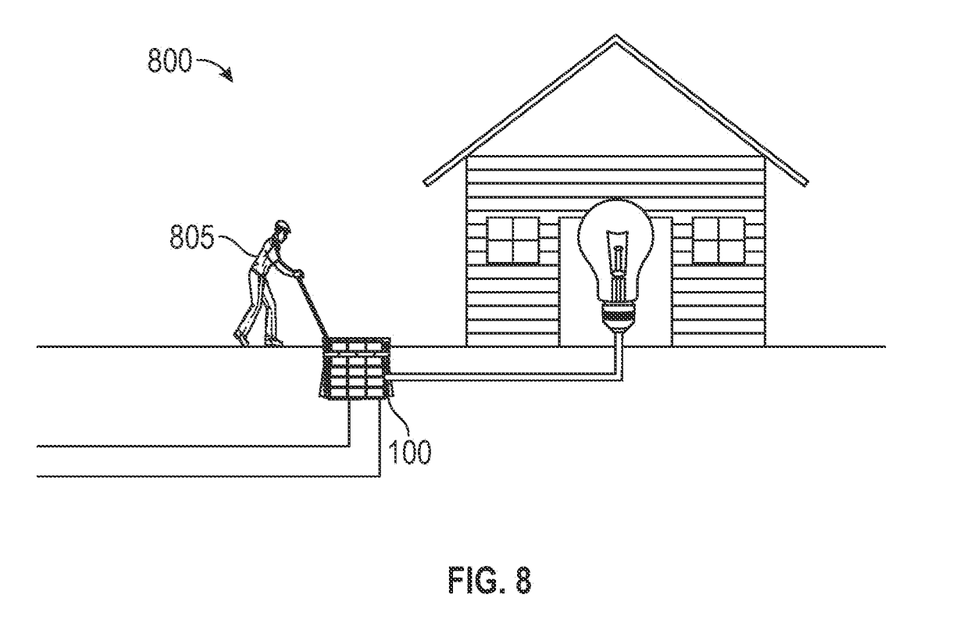
FIG. 8 is an environmental view of a device having features consistent with the invention of the present disclosure.
Figure 9:
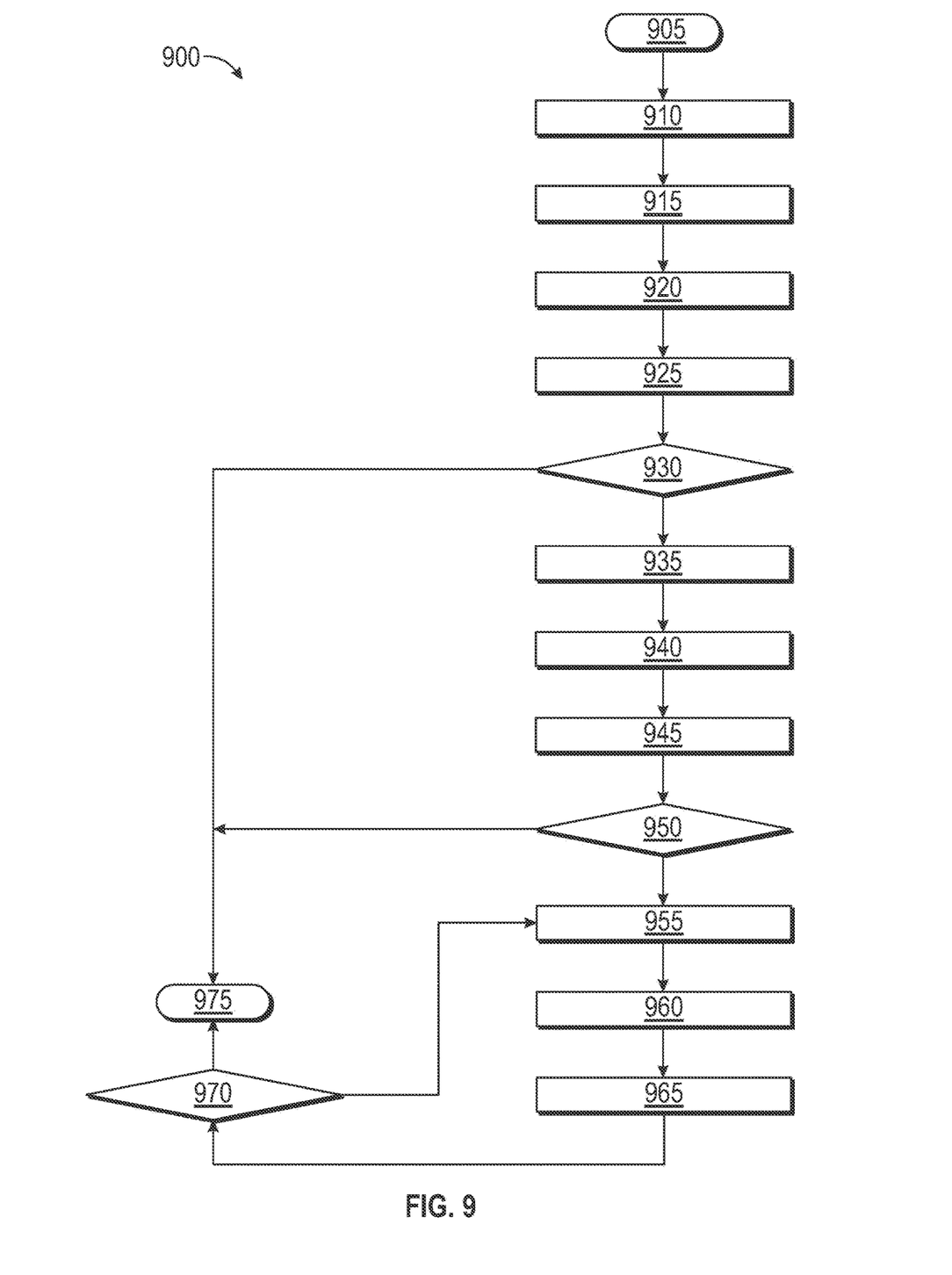
FIG. 9 a flow chart illustrating certain method steps of a method embodying features consistent with the principles of the present disclosure.

As illustrated in FIGS. 1A and 1B, the hinges 115 may allow the base box 105 and extension box 110 to fold so that they may be more easily transported. FIGS. 2 and 3 illustrate front views and back views of the device 100, respectively. In particular, FIGS. 2 and 3 illustrate the features of the exterior surfaces of the front panel 106, back panel 107, front extension panel 111, and back extension panel 112. FIGS. 4 and 5 illustrate side views of the base box 105 and extension box 110. In particular, FIGS. 4 and 5 illustrate the features of the exterior surfaces of the first side panel 108, second side panel 109, first side extension panel 113, and second side extension panel 114. FIG. 6 illustrates a top view of an embodiment of the base box 105 and extension box 110 with and without a lid 135. FIG. 7 illustrates a bottom view of the base box 105 and extension box 110 with and without a lid 135. FIG. 8 illustrates how one might use the device 100 in an environment 800. FIG. 9 illustrates a method that may be carried out by a worker 805 using the folding, flared utility vault.

As illustrated in FIGS. 1A and 1B, the base box 105 and extension box 110 may be connected and may be folded via hinges 115 that connect their respective panels. In other embodiments, the base box 105 is not connected to the extension box 110, as illustrated in FIG. 1B, but instead functions alone. In a preferred embodiment, the hinge 115 is formed by a plurality of side knuckles 116 attached to the edges of the various panels of the base box 105 and extension box 110. The side knuckles 116 have an aperture 117 that extends from the top end 128 to the bottom end 121 of the base box 105. The side knuckles further include an aperture 117 that extends from the top end 128 to the bottom end 121 of the base box 105 and/or extension box 110. In one preferred embodiment, the edges of the panels may be angled such that the side knuckles 116 may rotate freely without contacting another panel, as illustrated in FIGS. 1A and 1B.

A hinge mechanism may be inserted into the apertures 117 of the base box 105 and/or extension box 110 to hold the side knuckles 116 rotatable in place. In a preferred embodiment, the hinge mechanism is a pin. When the base box 105 and extension box 110 are connected together, they fold about said hinge mechanism. In one preferred embodiment, the apertures 117 of the side knuckles 116 has a diameter slightly smaller than the hinge mechanism such that insertion of the hinge mechanism compacts material of the side knuckles 116 within the apertures 117, thus causing pressure that holds the hinge mechanism in place. In another preferred embodiment, the hinge mechanism may be threaded, and the apertures 117 of certain side knuckles 116 may be larger than the hinge mechanism while the aperture 117 of other knuckles 116 may be threaded to interlock with the threads of the hinge mechanism. This may allow a worker 805 to adjust the height of the panels in relation to one another for application in which the ground is uneven. Other attachments and hinged mechanisms known in the art may also be utilized to create the hinges 115 without departing from the inventive subject matter herein.

In one preferred embodiment, the front panel 106, back panel 107, first side panel 108, and second side panel 109 may comprise an interior wall and an exterior wall. As illustrated in FIGS. 1A-5, the exterior walls of the front panel 106, back panel 107, first side panel 108, and second side panel 109 may comprise a plurality of compartments 119, wherein said plurality of compartments 119 may hold dirt, concrete, asphalt, or some other material. This may prevent the base box 105 from being pulled out of the ground once installed on a site by allowing the base box 105 to "grip" the dirt, concrete, asphalt, etc. In a preferred embodiment, as illustrated in the FIGS. 1A-5, the exterior wall may extend further away from the panels at the bottom end 121 of the base box 105 than at the top end 128, creating a base box 105 having a flared bottom 125. As illustrated, the base box 105 of the present invention comprises a flared bottom 125 having a flared interior space, thus providing additional interior room compared with straight-walled designs. This reduces the ground-mount surface area at the top end 128 while maximizing space towards the base end 121 of the base box 105. This is particularly important for storing slack cable since the flared design would force slacked electrical cables and/or fiber optic cables to remain in the base of the base box once relaxed, which reduces the chance for said cables to be damaged. For instance, a coiled telecommunications cable and electrical cable operably connected to a switch may be coiled by a worker 805 and placed in the bottom of said base box 105. The worker 805 may then allow the cables to relax and expand, thus preventing the cables from moving up through the narrower top of the base box 105. This not only secures the cables inside but also protects them from damage.

Because the flared wall bottoms are connected to a generally straight hinge, a preferred embodiment of the present invention allows for a non-linear configuration to hinge into a foldable system 100. In another preferred embodiment, the hinges 115 may be secured in place via pins, screws, or other removable locking elements, which may allow a worker 805 to lock the base box 105 and/or extension box 105 in an open position or unlock the base box 105 and/or extension box 105 so that it may be folded. In one preferred embodiment, the plurality of compartments 119 on the exterior wall of the front panel 106, back panel 107, first side panel 108, and second side panel 109 may extend further at the bottom end 121 of the base box 105 than the top end 128, creating compartments that increase in volume when moving from the top end 128 to the bottom end 121. The flared bottom 125 of the base box 105 prevents the box from being removed after installation by increasing the amount of surface area. Further, the flared bottom 125 allows dirt, concrete, asphalt, etc. to apply additional downward force to the front panel 106, back panel 107, first side panel 108, and second side panel 109, as illustrated in FIG. 8, thus preventing removal after installation and/or vertical lift caused by environmental conditions. For instance, the flared bottom 125 may prevent frost heave from lifting the base box 105 out of the ground by increasing the amount of surface area of the base box 105 in contact with dirt as well as by increasing the downward force exerted on the base box by said dirt.

In another preferred embodiment, as illustrated in FIGS. 3 and 5, the front panel 106, back panel 107, first side panel 108, and second side panel 109 of the base box 105 may comprise at least one opening 130 that allows pipes, wires, valves, etc. to extend in or out of said base box 105. For instance, a base box 105 used to house telecommunications equipment may have a front panel 106 having an opening 130 so fiberoptic cable may enter the base box 105 to access a switchgear. This same base box 105 may further comprise a back panel 107 having an opening 130 so fiberoptic cable may exit the base box 105 to a telecommunications tower. For instance, a base box 105 used to house waterworks utilities may comprise a front panel 106 having an opening 130 so a supply pipe may provide water to a building from a mainline encapsulated within the base box 105, wherein a meter housed within the base box 105 may measure the amount of water transferred from the mainline to the supply pipe. The openings 130 may be any shape so long as they allow pipes, wires, valves, etc. to extend into and out of the base box 105. For instance, the opening 130 may comprise an arch so that the base box 105 may be placed around a pipe after the installation of said pipe. For instance, the opening 130 may comprise a small threaded hole which may then be fitted with a threaded gasket so that electrical wiring may be threaded through the gasket, which may prevent water from entering the base box 105. Other connections and openings known in the art may also be utilized with the device and method FIGS. 6 and 7 illustrate top and bottom views of the device 100, respectively. In one preferred embodiment, a lid 135 may be removably attached at the top end 128 of the base box 105 via the front panel 106, back panel 107, first side panel 108, and second side panel 109 or the top end 122 of the extension box 110 via the front panel 111, back extension panel 112, first side extension panel 113, and second side extension panel 114. An inner ridge 126 at the top end 128 of the base box 105 and the top end 122 of the extension box 110 may provide a flanged area 137 for the lid 135 such that the lid 135 may securely sit on top of the device 100. Alternatively, a hinge may rotatably attach the lid 135 to the top end of the device 100. For instance, a plurality of knuckles 116 on the top end 128 of the front panel 106 may interlock with a plurality of knuckles 116 on the lid 135, wherein a hinge mechanism inserted through an aperture 117 of the plurality of knuckles 116 may rotatably attach the lid 135 to the front panel 106. In another preferred embodiment, the lid 135 may comprise a meter hole to allow for a worker 805 to check meter readings. The meter hole may be concealed by a meter tab, which may be rotatably secured to the lid 135. In yet another preferred embodiment, a vent hole 136 may allow air to escape from the utility vault/enclosure when shut. The interior walls of the front panel 106, back panel 107, first side panel 108, and second side panel 109 are preferably smooth. However, in other preferred embodiments, the interior walls may not be smooth, as illustrated in FIGS. 6 and 7. For instance, the interior walls may comprise a plurality of hooks that may allow a worker 805 to string electrical wire within the cavity of the device 100. For instance, the interior walls may be grooved in a way such if water condenses on the interior wall due to changes in temperature and/or humidity, the condensed water may be directed to an exit hole of the device 100 and away from any electronic equipment.

In a preferred embodiment, the base box 105 is configured to receive an extension box 110 or lid 135 at a flanged area 137 of the top end 128 of the front panel 106, back panel 107, first side panel 108, and second side panel 109, as illustrated in FIG. 6. The bottom end of the extension box 110 is configured to securely attach to the top end 128 of the base box 105. In a preferred embodiment, the front panel 106, back panel 107, first side panel 108, and second side panel 109 are configured such that an inner ridge 126 of the top end 128 is configured to accept the bottom end of an extension box 110 to sit within the base box 105. A plurality of holes 123 of the top end 128 of the base box 105 and the bottom end of the extension box 110 may allow a worker 805 to secure the extension box 110 to the base box 105. In a preferred embodiment, the extension box 110 is secured to the base box 105 via pins, screws, or other removable attachment elements. In another preferred embodiment, the top end 128 of the extension box 110 is also configured to receive a subsequent extension box 110, which may be secured via the attachment elements. Adding additional extension boxes 110 will allow a worker 805 to create a utility vault as large as necessary.

In another preferred embodiment, the exterior surfaces of the front extension panel 111, back extension panel 112, first side extension panel 113, and second side extension panel 114 may comprise a plurality of compartments 119, wherein said plurality of compartments 119 may hold dirt, concrete, asphalt, or some other material. This may allow the extension box 110 to "grip" dirt, concrete, asphalt, etc. in the same manner that the base box 105 might. Additionally, the inner surfaces of the of the front extension panel 111, back extension panel 112, first side extension panel 113, and second side extension panel 114 may be smooth or otherwise, depending on the application.

FIG. 9 provides a flow chart 900 illustrating certain, preferred method steps that may be used to carry out the process of installing a folding, flared utility vault. Step 905 indicates the beginning of the method. During step 910, a worker 805 may install a public utility at a particular location. Once the worker 805 has installed the public utility, the worker 805 must obtain a base box 105 for the purpose of encasing a public utility installation during step 915. In one preferred embodiment, the worker 805 may have to determine the specific base box 105 that must be used to encase the public utility installation. For instance, a worker 805 may have to determine whether to use a base box 105 designed for waterworks, telecommunications, or electrical before proceeding to the next step. Once the worker 805 has obtained the base box 105, the worker 805 may encase the public utility with the base box 105 during step 920. In some preferred embodiments, the worker 805 may have to insert or remove wires, pipes, fiberoptic cables, etc. through the openings 130 of the base box 105 prior to or after encasing the public utility with the base box 105.

Once encased, the worker 805 may determine whether an extension box 110 should be added to the base box 105 during step 925. The worker 805 may take an action based on that determination during step 930. If the worker 805 determines that no extension box 110 needs to be added to the base box 105, the worker 805 may proceed to the terminate method step 975. If the worker 805 determines that an extension box 110 does need to be added to the base box 105, the worker 805 may obtain an extension box 110 during step 935. Once the extension box 110 has been obtained, the worker 805 may attach the extension box 110 to the base box 105 during step 940. The worker 805 may then proceed to step 945, wherein the worker 805 may determine if a subsequent extension box 110 needs to be added to the previous extension box 110.

The worker 805 may take an action based on that determination during step 950. If the worker 805 determines that no subsequent extension box 110 needs to be added to the previous extension box 110, the worker 805 may proceed to the terminate method step 975. If the worker 805 determines that a subsequent extension box 110 does need to be added to the previous extension box 110, the worker 805 may obtain a subsequent extension box 110 during step 955. Once the subsequent extension box 110 has been obtained, the worker 805 may attach the subsequent extension box 110 to the previous extension box 110 during step 960. The worker 805 may then proceed to step 965, wherein the worker 805 may determine if a subsequent extension box 110 needs to be added to the previously added extension box 110. The worker 805 may take an action based on that determination during step 970. If the worker 805 determines that an extension box 110 does need to be added to the base box 105, the worker 805 may proceed to step 955. If the worker 805 determines that no extension box 110 needs to be added to the base box 105, the worker 805 may proceed to the terminate method step 975.

Although the systems and processes of the present disclosure have been discussed for use within the utility vault/enclosure field, one of skill in the art will appreciate that the inventive subject matter disclosed herein may be utilized in other fields or for other applications in which valves, pipes, wires, switchgears, etc. need to be encased. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results unless otherwise stated. It will be readily understood to those skilled in the art that various other changes in the details, materials, and arrangements of the parts and process stages which have been described and illustrated in order to explain the nature of this inventive subject matter can be made without departing from the principles and scope of the inventive subject matter.

What is claimed is

A base box comprising,
a front panel having side knuckles,
a back panel having said side knuckles,
a pair of side panels having said side knuckles,
wherein said side knuckles of said front panel, back panel, and pair of side panels interlock,
wherein an exterior surface and an interior surface of at least one of said front panel, back panel, and pair of side panels flairs outward at said bottom end of said base box, wherein a hinge mechanism inserted into an aperture of said side knuckles rotatably attaches said front panel, back panel, and pair of side panels,
wherein said front panel, back panel, and pair of side panels create an interior space when said side knuckles are rotatably attached,
wherein a flanged area at a top end of said front panel, back panel, and pair of side panels allows for the attachment of an extension box.

The system of claim 1, wherein said exterior surface of at least one of said front panel, back panel, and pair of side panels comprise a plurality of compartments, The system of claim 1, further comprising an opening in at least one of said back panel, front panel, and pair of side panels, wherein said opening grants utility lines additional access points and exit points to and from said interior space of said base box.

The system of claims 1, wherein said interior surface of at least one of said back panel, front panel, and pair of side panels further comprises a plurality of hooks.

The system of claims 1, wherein said interior surface of at least one of said back panel, front panel, and pair of side panels further comprises a plurality of grooves designed to direct liquid that condenses on said interior surface to an exit hole.

The system of claim 1, further comprising a lid configured to be secured within said flanged area at said top end of said front panel, back panel, and pair of side panels.

The system of claim 1, wherein said extension box comprises,
a front extension panel having said side knuckles,
a back extension panel having said side knuckles,
a pair of side extension panels having said side knuckles,
wherein said side knuckles of said front extension panel, back extension panel, and pair of side extension panels interlock,
wherein said hinge mechanism inserted into said aperture of said side knuckles rotatably attaches said front extension panel, back extension panel, and pair of side extension panels,
wherein said front extension panel, back extension panel, and pair of side extension panels create said interior space when said side knuckles are rotatably attached,
wherein said front extension panel, back extension panel, and pair of side extension panels creates said flanged area at said top end and allows for the attachment of an additional extension box,
wherein said bottom end of said front extension panel, back extension panel, and pair of side extension panels is configured to securely attach to said flanged area created by said back panel, front panel, and pair of side panels.

The system of claim 7, wherein said exterior surface of at least one of said front extension panel, back extension panel, and pair of side extension panels comprise a plurality of compartments.

The system of claim 7, wherein said exterior surface and said interior surface of at least one of said front extension panel, back extension panel, and side extension panels flairs outward at said bottom end.

The system of claim 9, wherein said interior surface of at least one of said front extension panel, back extension panel, and side extension panels further comprises a plurality of hooks.

The system of claim 9, wherein said interior surface of at least one of said front extension panel, back extension panel, and side extension panels further comprises a plurality of grooves designed to direct liquid that condenses on said interior surface to an exit hole.

The system of claim 7, further comprising an opening in at least one of said back extension panel, front extension panel, and pair of side extension panels, wherein said opening grants utility lines additional access points and exit points to and from said interior space of said extension box.

The system of claim 7, further comprising a lid configured to be secured within said flanged area at said top end of said front extension panel, back extension panel, and pair of side extension panels.

An extension box comprising,
a front extension panel having side knuckles,
a back extension panel having said side knuckles,
a pair of side extension panels having said side knuckles,
wherein said side knuckles of said front extension panel, back extension panel, and pair of side extension panels interlock,
wherein a hinge mechanism inserted into an aperture of said side knuckles rotatably attaches said front extension panel, back extension panel, and pair of side extension panels,
wherein said front extension panel, back extension panel, and pair of side extension panels create an interior space when said side knuckles are rotatably attached,
wherein a flanged area at a top end of said front extension panel, back extension panel, and pair of side extension panels allows for the attachment of an additional extension box,
wherein a bottom end of said front extension panel, back extension panel, and pair of side extension panels is configured to securely attach to said flanged area.

The system of claim 14, wherein an exterior surface of at least one of said front extension panel, back extension panel, and pair of side extension panels comprises a plurality of compartments.

The system of claim 14, wherein an exterior surface and an interior surface of at least one of said front extension panel, back extension panel, and pair of side extension panels flairs outward at said bottom end of said extension box.

The system of claims 14, wherein an interior surface of at least one of said back extension panel, front extension panel, and pair of side extension panels further comprises a plurality of hooks.

The system of claims 14, wherein an interior surface of at least one of said back extension panel, front extension panel, and pair of side extension panels further comprises a plurality of grooves designed to direct liquid that condenses on said interior surface to an exit hole.

The system of claim 14, further comprising an opening in at least one of said back extension panel, front extension panel, and pair of side extension panels, wherein said opening grants utility lines additional access points and exit points to and from said interior space of said extension box.

The system of claim 14, further comprising a lid configured to be secured within said flanged area at said top end of said front extension panel, back extension panel, and pair of side extension panels.

A utility vault comprising:
a base box having a front panel, back panel, and pair of side panels,
wherein an exterior surface and an interior surface of at least one of said front panel, back panel, and pair of side panels flairs outward at a bottom end,
wherein said exterior surface of at least one of said front panel, back panel, and pair of side panels comprise a plurality of compartments wherein side knuckles of said front panel, back panel, and pair of side panels are configured in a way such that said front panel and said back panel interlock with said pair of side panels,
wherein a hinge mechanism inserted into an aperture of said side knuckles rotatably attaches said front panel, back panel, and pair of side panels, and
an extension box having a front extension panel, back extension panel, and pair of side extension panels,
wherein said exterior surface and said interior surface of at least one of said front extension panel, back extension panel, and pair of side extension panels flairs outward at said bottom end,
wherein said exterior surface of at least one of said front extension panel, back extension panel, and pair of side extension panels comprise said plurality of compartments wherein said side knuckles of said front extension panel, back extension panel, and pair of side extension panels are configured in a way such that said front extension panel and said back extension panel interlock with said pair of side extension panels,
wherein said hinge mechanism inserted into said aperture of said side knuckles rotatably attaches said front extension panel, back extension panel, and pair of side extension panels,
wherein said bottom end of said extension box is configured to securely attach to said top end of said base box.

The system of claims 21, wherein an interior surface of at least one of said front panel, back panel, pair of side panels, back extension panel, front extension panel, and pair of side extension panels further comprises a plurality of hooks.

The system of claims 21, wherein an interior surface of at least one of said front panel, back panel, pair of side panels, back extension panel, front extension panel, and pair of side extension panels further comprises a plurality of grooves designed to direct liquid that condenses on said interior surface to an exit hole.

The system of claim 21, further comprising an opening in at least one of said front panel, back panel, pair of side panels, back extension panel, front extension panel, and pair of side extension panels, wherein said opening grants utility lines additional access points and exit points to and from said interior space of said extension box.

The system of claim 21, further comprising a lid configured to be secured within a flanged area at said top end of said front extension panel, back extension panel, and pair of side extension panels.

What is claimed is:

1. A utility vault comprising a base enclosure configured for attachment to an extension enclosure, the base enclosure comprising:
a front panel having side knuckles,
a back panel having said side knuckles,
a pair of side panels having said side knuckles,
wherein said side knuckles of said front panel, back panel, and pair of side panels interlock,
wherein an exterior surface and an interior surface of at least one of said front panel, back panel, and pair of side panels flares outward at said bottom end of said base enclosure,
wherein a hinge mechanism inserted into an aperture of said side knuckles rotatably attaches said front panel, back panel, and pair of side panels, wherein said front panel, back panel, and pair of side panels create an interior space when said side knuckles are rotatably attached, wherein a flanged area at a top end of said front panel, back panel, and pair of side panels allows for the attachment of the extension enclosure, wherein said exterior surface of at least one of said front panel, back panel, or pair of side panels comprise a plurality of compartments.

2. The utility vault of claim 1, further comprising an opening in at least one of said back panel, front panel, and pair of side panels, wherein said opening grants utility lines additional access points and exit points to and from said interior space of said base enclosure.

3. The utility vault of claim 1, wherein said interior surface of at least one of said back panel, front panel, and pair of side panels further comprises a plurality of hooks.

4. The utility vault of claim 1, wherein said interior surface of at least one of said back panel, front panel, and pair of side panels further comprises a plurality of grooves designed to direct liquid that condenses on said interior surface to an exit hole.

5. The utility vault of claim 1, further comprising a lid configured to be secured within said flanged area at said top end of said front panel, back panel, and pair of side panels.

6. The utility vault of claim 1, further comprising the extension enclosure, wherein said extension enclosure comprises, a front extension panel having said side knuckles,
a back extension panel having said side knuckles,
a pair of side extension panels having said side knuckles,
wherein said side knuckles of said front extension panel, back extension panel, and pair of side extension panels interlock, wherein said hinge mechanism inserted into said aperture of said side knuckles rotatably attaches said front extension panel, back extension panel, and pair of side extension panels, wherein said front extension panel, back extension panel, and pair of side extension panels create said interior space when said side knuckles are rotatably attached, wherein said front extension panel, back extension panel, and pair of side extension panels creates a flanged area at said top end and allows for the attachment of an additional extension enclosure, wherein said bottom end of said front extension panel, back extension panel, and pair of side extension panels is configured to securely attach to said flanged area created by said back panel, front panel, and pair of side panels of said base enclosure.

7. The utility vault of claim 6, wherein said exterior surface of at least one of said front extension panel, back extension panel, and pair of side extension panels comprise a plurality of compartments.

8. The utility vault of claim 6, wherein said exterior surface and said interior surface of at least one of said front extension panel, back extension panel, and side extension panels flares outward at said bottom end.

9. The utility vault of claim 8, wherein said interior surface of at least one of said front extension panel, back extension panel, and side extension panels further comprises a plurality of hooks.

10. The utility vault of claim 8, wherein said interior surface of at least one of said front extension panel, back extension panel, and side extension panels further comprises a plurality of grooves configured to direct liquid that condenses on said interior surface to an exit hole.

11. The utility vault of claim 6, further comprising an opening in at least one of said back extension panel, front extension panel, and pair of side extension panels, wherein said opening is configured to provide utility lines additional access points and exit points to and from said interior space of said extension enclosure.

12. The utility vault of claim 6, further comprising a lid configured to be secured within said flanged area at said top end of said front extension panel, back extension panel, and pair of side extension panels.

13. An extension box enclosure comprising,
a front extension panel having side knuckles,
a back extension panel having said side knuckles,
a pair of side extension panels having said side knuckles,
wherein said side knuckles of said front extension panel, back extension panel, and pair of side extension panels interlock, wherein a hinge mechanism inserted into an aperture of said side knuckles rotatably attaches said front extension panel, back extension panel, and pair of side extension panels, wherein said front extension panel, back extension panel, and pair of side extension panels create an interior space when said side knuckles are rotatably attached, wherein a flanged area at a top end of said front extension panel, back extension panel, and pair of side extension panels allows for the attachment of an additional extension enclosure, wherein said exterior surface of at least one of said front panel, back panel, or pair of side panels comprise a plurality of compartments.

14. The system of claim 13, wherein an exterior surface and an interior surface of at least one of said front extension panel, back extension panel, and pair of side extension panels flares outward at said bottom end of said extension enclosure.

15. The system of claim 13, wherein an interior surface of at least one of said back extension panel, front extension panel, and pair of side extension panels further comprises a plurality of hooks.

16. The system of claim 13, wherein an interior surface of at least one of said back extension panel, front extension panel, and pair of side extension panels further comprises a plurality of grooves designed to direct liquid that condenses on said interior surface to an exit hole.

17. The system of claim 13, further comprising an opening in at least one of said back extension panel, front extension panel, and pair of side extension panels, wherein said opening grants utility lines additional access points and exit points to and from said interior space of said extension enclosure.

18. The system of claim 13, further comprising a lid configured to be secured within said flanged area at said top end of said front extension panel, back extension panel, and pair of side extension panels.

19. A utility vault comprising:
a base enclosure having a front panel, back panel, and pair of side panels,
wherein an exterior surface and an interior surface of at least one of said front panel, back panel, and pair of side panels flares outward at a bottom end,
wherein said exterior surface of at least one of said front panel, back panel, and pair of side panels comprise a plurality of compartments,
wherein side knuckles of said front panel, back panel, and pair of side panels are configured in a way such that said front panel and said back panel interlock with said pair of side panels, wherein a hinge mechanism inserted into an aperture of said side knuckles rotatably attaches said front panel, back panel, and pair of side panels, and an extension enclosure having a front extension panel, back extension panel, and pair of side extension panels, wherein said exterior surface and said interior surface of at least one of said front extension panel, back extension panel, and pair of side extension panels flares outward at said bottom end, wherein said exterior surface of at least one of said front extension panel, back extension panel, and pair of side extension panels comprise said plurality of compartments, wherein said side knuckles of said front extension panel, back extension panel, and pair of side extension panels are configured in a way such that said front extension panel and said back extension panel interlock with said pair of side extension panels, wherein said hinge mechanism inserted into said aperture of said side knuckles rotatably attaches said front extension panel, back extension panel, and pair of side extension panels, wherein said bottom end of said extension enclosure is configured to securely attach to said top end of said base enclosure.

20. The system of claim 19, wherein an interior surface of at least one of said front panel, back panel, pair of side panels, back extension panel, front extension panel, and pair of side extension panels further comprises a plurality of hooks.

21. The system of claim 19, wherein an interior surface of at least one of said front panel, back panel, pair of side panels, back extension panel, front extension panel, and pair of side extension panels further comprises a plurality of grooves designed to direct liquid that condenses on said interior surface to an exit hole.

22. The system of claim 19, further comprising an opening in at least one of said front panel, back panel, pair of side panels, back extension panel, front extension panel, and pair of side extension panels, wherein said opening grants utility lines additional access points and exit points to and from said interior space of said extension enclosure.

23. The system of claim 19, further comprising a lid configured to be secured within a flanged area at said top end of said front extension panel, back extension panel, and pair of side extension panels.

* * * * *